(12) United States Patent
Lu et al.

(10) Patent No.: US 9,561,465 B2
(45) Date of Patent: Feb. 7, 2017

(54) ECOSYSTEM AND PLANT USING THE SAME

(71) Applicant: TSRC Corporation, Taipei (TW)

(72) Inventors: Jung Chang Lu, Kaohsiung (TW);
Cheng Hsien Lin, Kaohsiung (TW);
Sheng-Te Yang, Hsinchu (TW)

(73) Assignee: TSRC Corporation, Taipei (TW)

( * ) Notice: Subject to any disclaimer, the term of this patent is extended or adjusted under 35 U.S.C. 154(b) by 216 days.

(21) Appl. No.: 14/093,145

(22) Filed: Nov. 29, 2013

(65) Prior Publication Data
US 2015/0093297 A1 Apr. 2, 2015

(30) Foreign Application Priority Data
Sep. 30, 2013 (TW) .............................. 102135423 A (51) Int. Cl.
| | |
|---|---|
| *B01D 53/34* | (2006.01) |
| *F23L 15/02* | (2006.01) |
| *F26B 25/00* | (2006.01) |
| *B01D 53/96* | (2006.01) |
| *F26B 23/00* | (2006.01) |

(Continued)

(52) U.S. Cl.
CPC .............. *B01D 53/343* (2013.01); *B01D 53/96* (2013.01); *F23L 15/02* (2013.01); *F26B 23/001* (2013.01); *F26B 23/007* (2013.01); *F26B 23/022* (2013.01); *F26B 25/005* (2013.01); *B01D 2259/65* (2013.01); *F25B 15/00* (2013.01);
(Continued)

(58) Field of Classification Search
CPC ... B01D 53/343; B01D 53/96; B01D 2259/65; F23G 7/068; F23L 15/02; F26B 23/001; F26B 23/007; F26B 23/022; F26B 25/005

USPC ........ 422/173, 175; 432/179, 180, 181, 182; 34/479
See application file for complete search history.

(56) References Cited

U.S. PATENT DOCUMENTS

| | | | | |
|---|---|---|---|---|
| 5,983,521 | A | * 11/1999 | Thompson | ............ F26B 23/022 110/216 |
| 2005/0262869 | A1 | 12/2005 | Tongu et al. | |
| 2010/0139115 | A1* | 6/2010 | Schmidt | ................ F26B 23/022 34/480 |

FOREIGN PATENT DOCUMENTS

| | | |
|---|---|---|
| JP | 62-254827 A | 11/1987 |
| JP | 11-325443 A | 11/1999 |

(Continued)

OTHER PUBLICATIONS

JPO; Office Action mailed Apr. 28, 2015 in corresponding Japanese Application No. 2014-061187.

*Primary Examiner* — Jill Warden
*Assistant Examiner* — Joye L Woodard
(74) *Attorney, Agent, or Firm* — Snell & Wilmer L.L.P.

(57) ABSTRACT

An ecosystem operated in a plant having a drying unit is provided. The ecosystem includes: a regenerative thermal oxidization unit for processing a waste gas to produce a hot gas; a first hot gas pipeline connected to the regenerative thermal oxidization unit and the drying unit, wherein the hot gas is transferred from the regenerative thermal oxidization unit to the drying unit via the first hot gas pipeline; a heat recovery unit disposed at the first hot gas pipeline to absorb heat from the first hot gas pipeline; an absorption refrigeration unit connected to a target to be cooled; and a hot liquid pipeline connected to the heat recovery unit and the absorption refrigeration unit, wherein the heat recovery unit transfers heat from the first hot gas pipeline to the absorption refrigeration unit via the hot liquid pipeline to actuate the absorption refrigeration unit to cool the target.

5 Claims, 4 Drawing Sheets

(51) Int. Cl.
  *F26B 23/02* (2006.01)
  *F25B 27/02* (2006.01)
  *F25B 15/00* (2006.01)
(52) U.S. Cl.
  CPC ............... *F25B 27/02* (2013.01); *Y02P 70/40* (2015.11); *Y02P 70/405* (2015.11)

(56) References Cited

FOREIGN PATENT DOCUMENTS

| JP | 2002-061983 A | 2/2002 |
| JP | 2002-286324 A | 10/2002 |
| JP | 2007-247922 A | 9/2007 |

\* cited by examiner

ECOSYSTEM AND PLANT USING THE SAME

CROSS REFERENCE TO RELATED APPLICATION

This application claims the right of priority based on Taiwan Patent Application No. 102135423 entitled "ECOSYSTEM AND PLANT USING THE SAME" filed on Sep. 30, 2013, which is incorporated herein by reference and assigned to the assignee herein.

FIELD OF THE INVENTION

The present invention relates to ecosystems, and more particularly, to an ecosystem for use in a plant.

BACKGROUND OF THE INVENTION

In general, plants nowadays process rubbish at the cost of a waste of energy and resources. Taking a chemical plant as an example, it carries out a product manufacturing process, which produces a specific amount of waste gas or redundant gas, such as volatile organic compounds, which are discharged to a conventional flare tower to undergo a combustion process before being discharged to the environment. Environmental protection laws in force require that the conventional flare tower is restricted to urgent waste/redundant gas discharge following process malfunction and prohibited from serving as a regular environmental protection processing tool or equipment. The waste/redundant gas must be treated with an environmental protection processing system, such as a heat-storing oxidization furnace or any other incinerator before being discharged to the environment. Hence, the plant must provide sufficient power to an ecosystem. The ecosystem converts the waste gas into clean gas and then releases the clean gas to the environment. The clean gas as a product of combustion carries a high level of thermal energy. If the humankind releases the clean gas to the environment without making good use of its thermal energy, there will be a waste of energy. Furthermore, the environmental protection laws prohibit the release of the clean gas at high temperature. Hence, to abide by the environmental protection laws, it is necessary to reduce the temperature of the clean gas to an appropriate temperature with a cooling apparatus before releasing the clean gas to the environment. However, it amounts to a waste of resources by installing a cooling apparatus for the mere purpose of cooling the clean gas to be released to the environment. In view of this, plants, especially those confronted with the aforesaid waste gas processing-related problems, are usually looking forward to an applicable ecosystem effective in solving problems pertaining to a waste of energy and resources.

SUMMARY OF THE INVENTION

The present invention provides an ecosystem operated in a plant. Plants capable of operating the ecosystem of the present invention preferably include any plant, which produces redundant heat or waste gas. The redundant heat or waste gas can originate from raw materials, products, or intermediate products, or is produced as a result of a preparation process, an equipment maintenance process, a finished product packaging process, and/or rubbish processing. The waste gas comprises organic chemical substances, which are likely to evaporate at normal temperature and normal pressure and thus are harmful to human beings and the Earth's ecological environment, are commonly known as volatile organic compounds. A plant capable of operating the ecosystem of the present invention preferably comprises a drying unit. The drying unit comprises apparatuses for drying any substances, including any apparatuses for drying raw materials, products, or intermediate products or drying a package or container.

In one aspect of the present invention, the ecosystem recovers the plant's redundant heat by applying the redundant heat to refrigeration. In another aspect of the present invention, the ecosystem converts the plant's waste gas into clean gas and applies conversion-derived heat to refrigeration. In yet another aspect of the present invention, heat recovery cools down the clean gas so as to be for use in drying.

In an embodiment, the present invention provides an ecosystem operated in a plant having a drying unit. The ecosystem comprises: a regenerative thermal oxidization unit for processing a waste gas to produce a hot gas; a first hot gas pipeline connected to the regenerative thermal oxidization unit and the drying unit, wherein the hot gas exits the regenerative thermal oxidization unit and enters the drying unit via the first hot gas pipeline; a heat recovery unit disposed at (e.g., in the vicinity of) the first hot gas pipeline and adapted to absorb heat from the first hot gas pipeline; an absorption refrigeration unit connected to a target to be cooled in the plant; and a hot liquid pipeline connected to the heat recovery unit and the absorption refrigeration unit, wherein the heat recovery unit transfers the heat from the first hot gas pipeline to the absorption refrigeration unit via the hot liquid pipeline so as to actuate the absorption refrigeration unit to cool the target.

In the exemplary ecosystem, the drying unit is selectively for use in drying a chemical, and the chemical is dried by blowing the hot gas onto the chemical.

In the ecosystem, the hot gas preferably passes through the heat recovery unit to cool down before reaching the drying unit.

The ecosystem preferably further comprises a second hot gas pipeline connected to the drying unit and the regenerative thermal oxidization unit and adapted to transfer the hot gas from the drying unit to the regenerative thermal oxidization unit.

In the ecosystem, the hot liquid pipeline preferably forms a loop and enables connection between the absorption refrigeration unit and the heat recovery unit (e.g., from the absorption refrigeration unit to the heat recovery unit, and/or vice versa).

In the ecosystem, the ecosystem preferably further comprises a refrigerating liquid pipeline connecting the absorption refrigeration unit and the target, forming a loop, and enabling connection between the absorption refrigeration unit and the target (e.g., from the absorption refrigeration unit to the target, and/or vice versa).

As regards to the ecosystem, the plant preferably has a heating unit, and the ecosystem further comprises a third hot gas pipeline for connecting the heating unit and the regenerative thermal oxidization unit.

As regards to the ecosystem, the plant preferably has a heating unit, and the ecosystem further comprises a fourth hot gas pipeline for connecting the heating unit and the heat recovery unit.

In another embodiment, the present invention provides a plant having an ecosystem. The plant comprises: a reactor for producing a chemical; a separation unit for separating reactants recovered in the chemical preparation process; a reactant recovery pipeline for connecting the separation unit and the reactor and transferring the separated reactants back to the reactor; and the ecosystem comprising: a first hot gas pipeline and a heat recovery unit disposed at the first hot gas pipeline, wherein the heat recovery unit takes in heat from the first hot gas pipeline; a hot liquid pipeline connected to the heat recovery unit; and an absorption refrigeration unit disposed at the hot liquid pipeline; and a refrigerating liquid pipeline connected to the absorption refrigeration unit and the reactant recovery pipeline, wherein the heat recovery unit transfers the heat to the absorption refrigeration unit via the hot liquid pipeline, and the absorption refrigeration unit causes the refrigerating liquid pipeline to cool down and thereby cools down the reactant recovery pipeline.

As regards to the plant, before the refrigerating liquid pipeline cools down the reactant recovery pipeline, the reactant recovery pipeline has a higher temperature than the reactor.

The plant preferably has a drying unit adapted to dry the chemical and connected to the hot gas pipeline, wherein the hot gas is cooled down by the heat recovery unit before reaching the drying unit.

As regards to the plant, the ecosystem preferably comprises a regenerative thermal oxidization unit connected to the first hot gas pipeline and adapted to produce a hot gas to be entered into the first hot gas pipeline.

As regards to the plant, the drying unit is preferably for use in drying a chemical, and the chemical is dried by blowing the hot gas onto the chemical.

As regards to the plant, the ecosystem preferably comprises a regenerative thermal oxidization unit connected to the first hot gas pipeline and adapted to produce a hot gas which eventually reaches the drying unit via the first hot gas pipeline, and the ecosystem further comprises a second hot gas pipeline for connecting the drying unit and the regenerative thermal oxidization unit and transferring the hot gas from the drying unit to the regenerative thermal oxidization unit.

The plant preferably comprises a heating unit and a third hot gas pipeline for connecting the heating unit and the regenerative thermal oxidization unit.

The plant preferably comprises a heating unit and a fourth hot gas pipeline for connecting the heating unit and the heat recovery unit.

In yet another embodiment, the present invention provides a plant having an ecosystem. The plant comprises: a reactor for producing a chemical; and a reacting solution pipeline for transferring raw materials to the reactor. The ecosystem comprises: a first hot gas pipeline and a heat recovery unit disposed at the first hot gas pipeline, wherein the heat recovery unit takes in heat from the first hot gas pipeline; a hot liquid pipeline connected to the heat recovery unit; an absorption refrigeration unit disposed at the hot liquid pipeline; and a refrigerating liquid pipeline for connecting the absorption refrigeration unit and the reacting solution pipeline, wherein the heat recovery unit transfers the heat to the absorption refrigeration unit via the hot liquid pipeline, and the absorption refrigeration unit causes the refrigerating liquid pipeline to cool down and thereby cools down the reacting solution pipeline.

As regards to the plant, before the refrigerating liquid pipeline cools down the reacting solution pipeline, the reacting solution pipeline has higher temperature than the reactor.

As regards to the plant, the ecosystem preferably comprises a regenerative thermal oxidization unit connected to the first hot gas pipeline and adapted to produce a hot gas to be entered into the first hot gas pipeline and eventually transferred to the drying unit, and a second hot gas pipeline for connecting the drying unit and the regenerative thermal oxidization unit and transferring the hot gas from the drying unit to the regenerative thermal oxidization unit.

The plant preferably comprises a heating unit and a third hot gas pipeline for connecting the heating unit and the regenerative thermal oxidization unit.

The plant preferably comprises a heating unit and a fourth hot gas pipeline for connecting the heating unit and the heat recovery unit.

There is also disclosed herein a plant having an ecosystem, the plant comprising: a reactor for producing a chemical; and one or both of: (i) a separation unit for separating reactants recovered in the chemical preparation process; and a reactant recovery pipeline for connecting the separation unit and the reactor in order to transfer the separated reactants back to the reactor; and/or (ii) a reacting solution pipeline for transferring raw materials to the reactor; the ecosystem comprising: a first hot gas pipeline and a heat recovery unit disposed at the first hot gas pipeline, wherein the heat recovery unit absorbs heat from the first hot gas pipeline; a hot liquid pipeline connected to the heat recovery unit; an absorption refrigeration unit disposed at the hot liquid pipeline; and a refrigerating liquid pipeline for connecting the absorption refrigeration unit and the reactant recovering pipeline and/or reacting solution pipeline, wherein the heat recovery unit transfers the heat to the absorption refrigeration unit via the hot liquid pipeline, and the absorption refrigeration unit lowers a temperature of the refrigerating liquid pipeline to thereby cool down the reactant recovery pipeline and/or reacting solution pipeline.

The embodiments described below illustrate the other aspects of the present to thereby solve the other problems in conjunction with the aforesaid aspects of the present invention.

DETAILED DESCRIPTION OF THE EMBODIMENTS

Preferred embodiments of the present invention are described below and illustrated with the accompanying drawings. Like components shown in the accompanying drawings are denoted with like reference numerals and/or letters. To illustrate the present invention clearly, the accompanying drawings are not necessarily drawn to scale. To highlight the technical features of the present invention, the description below omits conventional parts and components, related materials, and processing technologies related thereto.

It should be noted that where terminology is used in this specification denoting that an item is 'connected to' another item (or similar such language), this does not necessarily require that the items are directly connected to one another, for example by a single continuous pipeline or suchlike. There may be intervening structures between the items that are 'connected' together.

Figure 1:
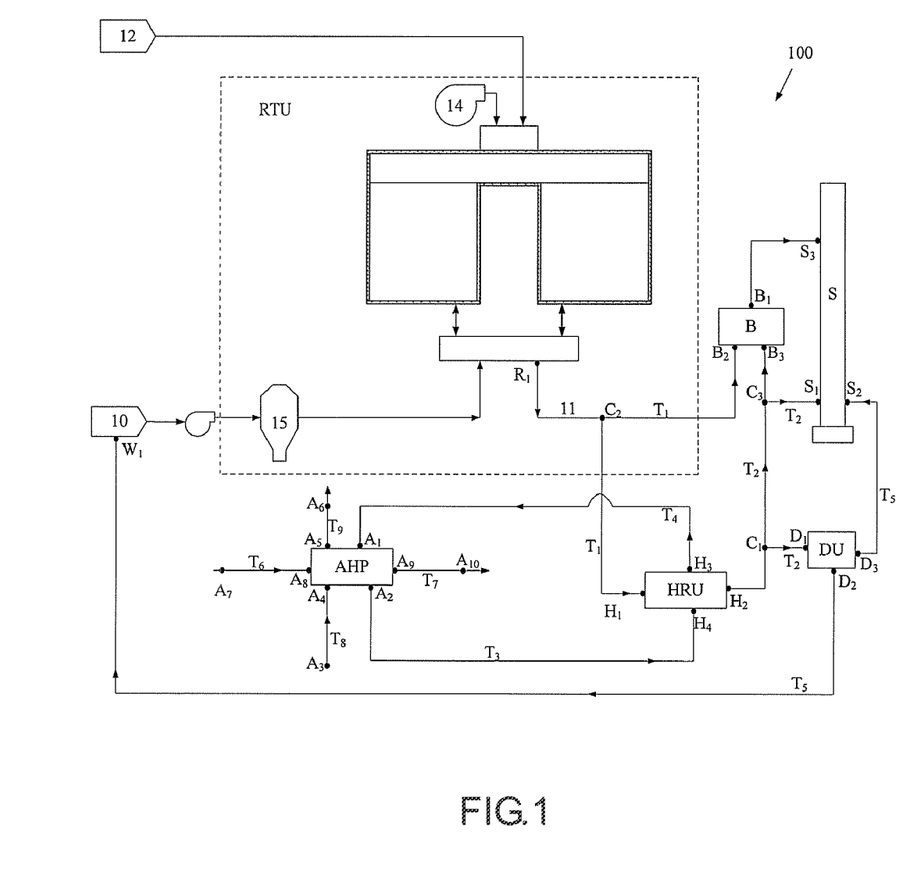
FIG. 1 is a schematic view of units of an ecosystem and their connection according to exemplary embodiments of the present invention.

Referring to FIG. 1, there is shown a schematic view of units of an ecosystem 100 and their connection according to the present invention. As shown in FIG. 1, the ecosystem 100 is operating in a plant equipped with a drying unit DU. A waste gas 10 is present in the plant. The ecosystem 100 comprises a regenerative thermal oxidization unit RTU, a heat recovery unit HRU, an absorption refrigeration unit AHP, and a first hot gas pipeline R1-H1-H2-D1 connected to the regenerative thermal oxidization unit RTU and the drying unit DU. The heat recovery unit HRU is disposed at the hot gas pipeline R1-H1-H2-D1 and connected to the regenerative thermal oxidization unit RTU and the drying unit DU by means of the hot gas pipeline R1-H1-H2-D1. The ecosystem 100 further comprises a hot liquid pipeline H3-A1-A2-H4 that connects the heat recovery unit HRU and absorption refrigeration unit AHP, forms a loop, and enables connection between the heat recovery unit HRU and the absorption refrigeration unit AHP.

Referring to FIG. 1, the regenerative thermal oxidization unit RTU combusts and processes the waste gas 10 to produce a hot gas 11. The hot gas 11 exits the regenerative thermal oxidization unit RTU and enters the hot gas pipeline R1-H1-H2-D1. Then, the hot gas 11 passes through the heat recovery unit HRU and then reaches the drying unit DU. The heat recovery unit HRU takes in a portion of heat from the hot gas 11 passing through the heat recovery unit HRU and transfers the portion of heat to the pipeline segment H3-A1 of the hot liquid pipeline. Hence, the temperature of the hot gas pipeline R1-H1-H2-D1 decreases from T1 (i.e., the temperature at the pipeline segment R1-H1) to T2 (i.e., the temperature at the pipeline segments H2-D1, H2-S1, H2-B3). Upon receipt of the heat from the heat recovery unit HRU, the pipeline segment H3-A1 of the hot liquid pipeline has a temperature T4. The pipeline segment H3-A1 further connects the absorption refrigeration unit AHP which takes in heat from the pipeline segment H3-A1, such that the temperature decreases to T3 at the pipeline segment A2-H4. Afterward, the pipeline segment A2-H4 returns to the heat recovery unit HRU and takes in heat from the heat recovery unit HRU, such that the temperature at the pipeline segment H3-A1 increases to T4. In addition to the hot liquid pipeline H3-A1-A2-H4, pipelines connecting the absorption refrigeration unit AHP still include the cooling liquid pipeline A3-A4-A5-A6 and the refrigerating liquid pipeline A7-A8-A9-A10 in the ecosystem 100. The absorption refrigeration unit AHP operates in conjunction with the hot liquid pipeline, the cooling liquid pipeline, and the refrigerating liquid pipeline to decrease the temperature of the refrigerating liquid pipeline from T6 (i.e., the temperature at the pipeline segment A7-A8) to T7 (i.e., the temperature at the pipeline segment A9-A10) and increase the temperature of the cooling liquid pipeline from T8 (i.e., the temperature at the pipeline segment A3-A4) to T9 (i.e., the temperature at the pipeline segment A5-A6). Hence, it is feasible to apply the cooling liquid pipeline or the refrigerating liquid pipeline of the absorption refrigeration unit AHP to the other units of the plant in accordance with the intended temperature of the other units of the plant. Examples of the other units of the plant include an apparatus for use in a process, a pipeline to be cooled, and a refrigeration/air conditioning pipeline of an office or building.

Referring to FIG. 1, to combust the waste gas 10, it is necessary to supply an appropriate fuel 12 to the regenerative thermal oxidization unit RTU. The regenerative thermal oxidization unit RTU further comprises a gas inlet 14 for introducing an appropriate combustion-enabling gas and/or a filter 15 for filtering combustion-disabling impurities out of the waste gas 10.

Referring to FIG. 1, after passing through the heat recovery unit HRU, the hot gas 11 not only reaches the drying unit DU via the pipeline segment H2-D1 of the hot gas pipeline but is also discharged to a chimney S via the pipeline segment C1-S1. Upon its arrival at the drying unit DU, the hot gas 11 interacts with the drying unit DU, such that its temperature decreases from T2 (i.e., the temperature at the pipeline segment H2-D1) to T5 (i.e., the temperature at the pipeline segments D2-W1, D3-S2). If the gas produced as a result of drying effect through the drying unit DU is still clean, the clean gas will be discharged to the chimney S (pipeline segment D3-S2); however, if the gas produced as a result of drying effect through the drying unit DU contains volatile organic compounds or is unfitted to be discharged, the gas will join the waste gas 10 and then return to the regenerative thermal oxidization unit RTU (pipeline segment D2-W1).

Referring to FIG. 1, the heat recovery unit HRU is disposed at the hot gas pipeline R1-H1-H2-D1 that precedes the drying unit DU—the destination of the hot gas 11. By contrast, in another embodiment, the heat recovery unit HRU is disposed at the hot gas pipeline (D2-W1 or D3-S2) that follows the drying unit DU, that is, the destination of the hot gas 11, to serve another purpose.

Figure 2:
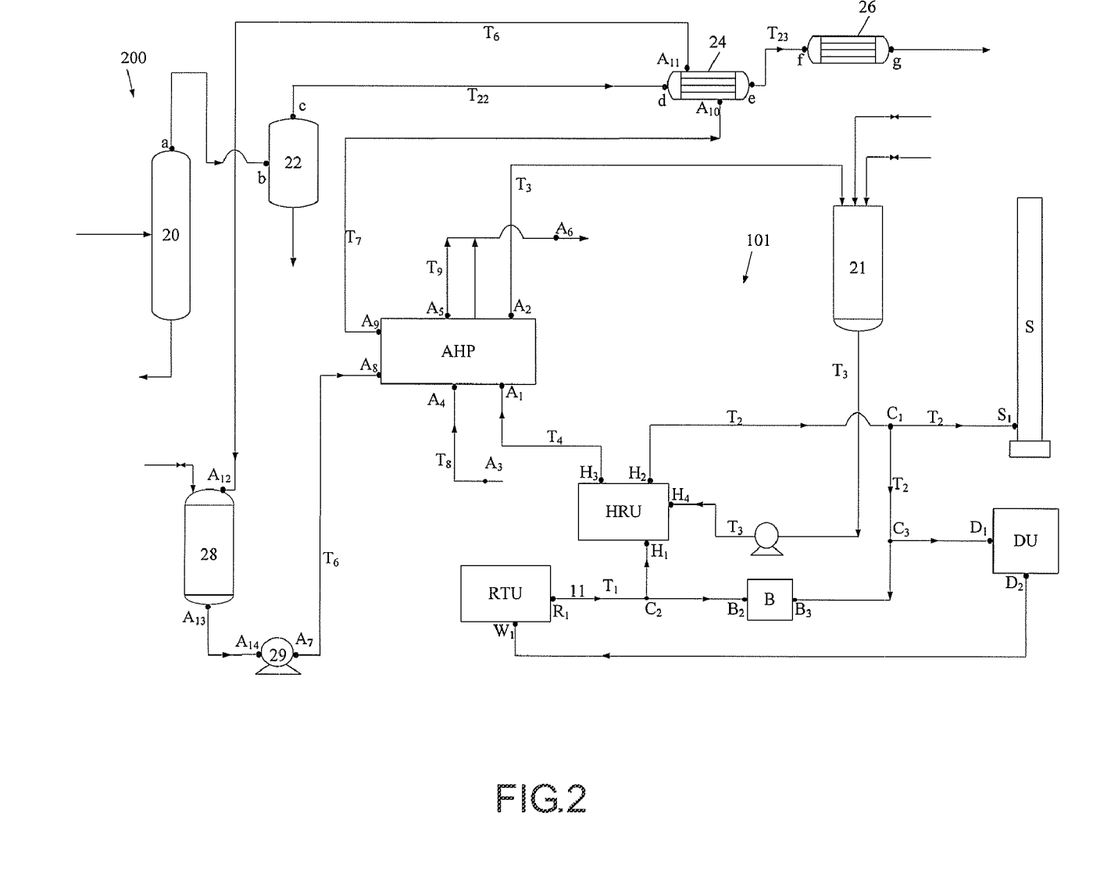
FIG. 2 is a schematic view of the application of an ecosystem to a plant according to a first embodiment of the present invention.

Referring to FIG. 1, the hot gas 11 discharged from the regenerative thermal oxidization unit RTU not only enters the hot gas pipeline R1-C2-H1 in order to reach the heat recovery unit HRU, but also selectively enters a second hot gas pipeline R1-C2-B2 in order to reach a heating unit B of the plant. For example, the heating unit B heats up water to produce steam, heats up a liquid, or heats up a gas. The hot gas pipeline R1-C2-B2 connected to the heating unit B works in all situations, including the situation where the plant is not equipped with the heat recovery unit HRU, and the situation where the heat recovery unit HRU is idle temporarily but the regenerative thermal oxidization unit RTU is operating. Similarly, the hot gas 11 discharged from the heat recovery unit HRU not only enters the hot gas pipeline H2-C1-D1 in order to reach the drying unit DU, but also selectively enters a third hot gas pipeline H2-C1-C3-B3 in order to reach the heating unit B. The hot gas pipeline H2-C1-C3-B3 connected to the heating unit B works in all situations, including the situation where the plant is not equipped with the drying unit DU, and the situation where the drying unit DU is idle temporarily but the heat recovery unit HRU is operating. The hot gas pipeline connected to the heating unit B prevents heat from being directly discharged to the chimney S to thereby cause a waste of energy. The heating unit B is further selectively equipped with a hot gas pipeline B1-S3 whereby the hot gas 11, which passes through the heating unit B to cool down, is discharged to the chimney Referring to FIG. 2, there is shown a schematic view of the application of an ecosystem 101 to a chemical plant 200 according to the first embodiment of the present invention. As shown in FIG. 2, the chemical plant 200 manufactures a rubber from raw materials, such as styrene and other chemicals. The chemical plant 200 comprises: a reactor (not shown) whose reaction temperature is set to T21 (not shown); the drying unit DU for drying the rubber; and a separation unit 20 for separating reactants recovered in the rubber preparation process and reusing them. A reacting mixture contains styrene, water, other raw materials or impurities. In this embodiment, the separation unit 20 is a stripping column or any appropriate separation apparatus. After the reacting mixture has been processed with the separation unit 20, styrene exits the separation unit 20 and enters a styrene recovery pipeline a-b-c-d-e-f-g. The temperature T22 of the recovered styrene that has been processed with the separation unit 20 is higher than the preset reaction temperature T21 of the reactor. To render the recovered styrene suitable for entry into the reactor, the chemical plant 200 uses the ecosystem 101 to decrease the temperature of the pipeline segment e-f-g of the styrene recovery pipeline (in a manner described below). As shown in FIG. 2, a first heat exchanger 24 is disposed at the styrene recovery pipeline a-b-c-d-e-f-g and connected to the ecosystem 101. With the ecosystem 101 operating, the segment a-b-c-d of the styrene recovery pipeline initially has a temperature T22; however, due to the chilling effect of the first heat exchanger 24, the temperature of the segment e-f-g of the styrene recovery pipeline becomes T23 or lower, where T23<T22. In addition to the first heat exchanger 24, the styrene recovery pipeline a-b-c-d-e-f-g is connected to a styrene storage tank 22 and a second heat exchanger 26 as needed. The styrene storage tank 22 is connected to any other pipeline segment to expand its functionality. The second heat exchanger 26 comes in the form of a typical ammonia refrigerator or brine refrigerator and is not connected to the ecosystem 101. The second heat exchanger 26 assists the first heat exchanger 24 in regulating the temperature of the recovered styrene such that the recovered styrene is suitable for entry into the reactor.

Referring to FIG. 2, there is shown a schematic view of the application of the ecosystem 101 to the chemical plant 200 according to the first embodiment of the present invention. Like the ecosystem 100, the ecosystem 101 comprises the regenerative thermal oxidization unit RTU, the heat recovery unit HRU, the hot gas pipeline R1-H1-H2-D1, the absorption refrigeration unit AHP, the hot liquid pipeline H3-A1-A2-H4, the cooling liquid pipeline A3-A4-A5-A6, and the refrigerating liquid pipeline A7-A8-A9-A10-A11-A12-A13-A14. The regenerative thermal oxidization unit RTU turns a waste gas into a clean gas (i.e., the hot gas 11), wherein the waste gas is produced in the course of the manufacturing of the rubber by the chemical plant 200. The heat recovery unit HRU is disposed at the hot gas pipeline R1-H1-H2-D1 and connected to the regenerative thermal oxidization unit RTU and the drying unit DU by the hot gas pipeline R1-H1-H2-D1. The hot liquid pipeline H3-A1-A2-H4 connects the heat recovery unit HRU and the absorption refrigeration unit AHP. The hot liquid pipeline H3-A1-A2-H4 forms a loop and enables connection between the heat recovery unit HRU and the absorption refrigeration unit AHP. In this embodiment, a hot water storage tank 21 is disposed at the pipeline segment A2-H4 of the hot liquid pipeline as needed. The hot water storage tank 21 is in connection with another pipeline, such as a steam condensing water pipeline or a process water pipeline in the plant, in order to regulate the temperature of the hot liquid pipeline H3-A1-A2-H4.

Figure 4:
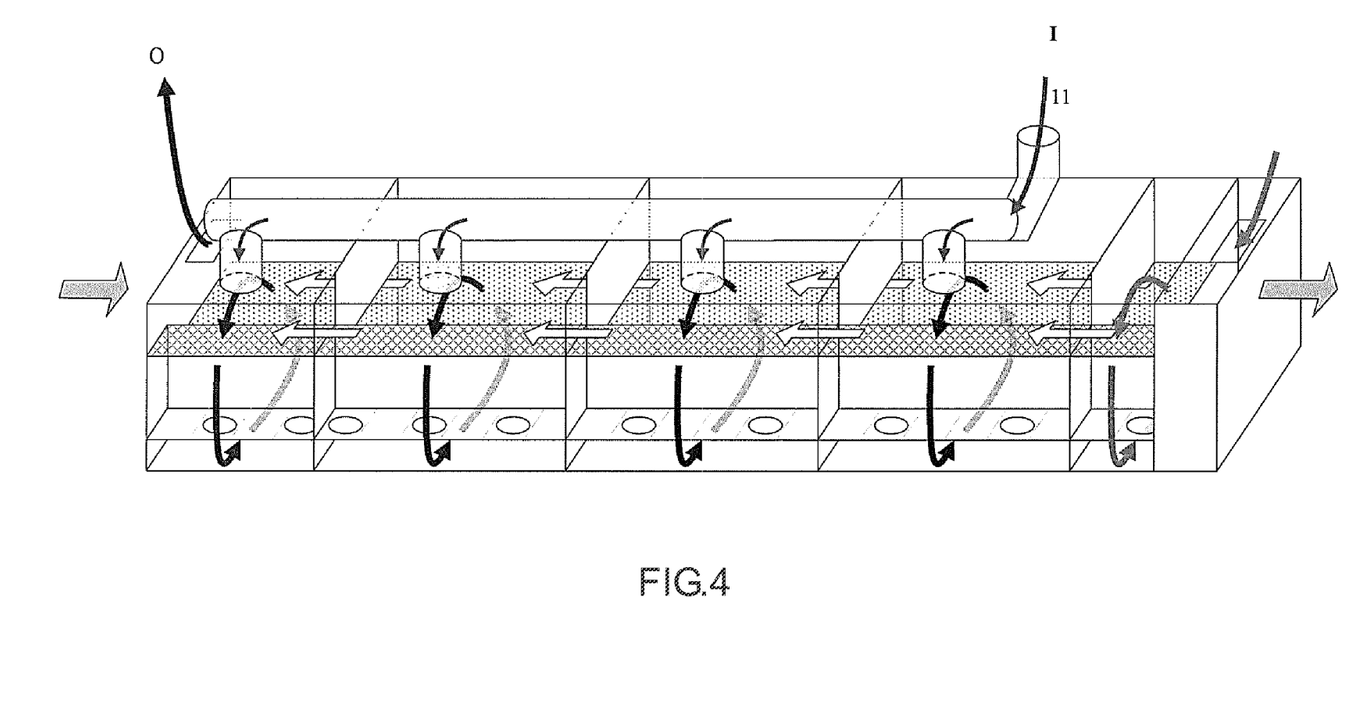
FIG. 4 is a schematic view of a drying unit of the ecosystem according to exemplary embodiments of the present invention.

Referring to FIG. 2, the waste gas 10 is combusted and processed in the regenerative thermal oxidization unit RTU to produce the hot gas 11 for entry into the hot gas pipeline R1-H1-H2-D1, and then the hot gas 11 passes through the heat recovery unit HRU to reach the drying unit DU. The heat recovery unit HRU takes in a portion of heat from the hot gas 11 passing through the heat recovery unit HRU and transfers the portion of heat to the hot liquid pipeline H3-A1-A2-H4. Hence, the temperature of the hot gas pipeline decreases from T1 (i.e., the temperature at the pipeline segment R1-H1) to T2 (i.e., the temperature at the pipeline segments H2-D1, H2-S1). Selectively, the hot gas 11 thus cooled down is discharged to the chimney S via the pipeline segment H2-S1 or introduced into the drying unit DU via the pipeline segment H2-D1. In this embodiment, the drying unit DU serves to dry a rubber aggregate rich in moisture and comes in the form of a caterpillar-driven drying bed apparatus shown in FIG. 4 or any other fluidized bed dryer. Referring to FIG. 4, the caterpillar-driven drying bed apparatus comprises: a hot air inlet I for introducing the hot gas 11; and a hot air outlet O for discharging the waste gas 10 which has passed through the drying device. After being processed with the caterpillar-driven drying bed apparatus, the water content of the rubber aggregate is reduced greatly, for example, from 12 wt % to 0.5 wt %. In this embodiment, if the hot gas 11 is directly introduced into the drying unit DU, the rubber would probably being melted, decomposed or denatured due to the overly high temperature T1 of the hot gas 11. Hence, in view of the overly high temperature T1, it is necessary to reduce the temperature of the hot gas 11 appropriately with the heat recovery unit HRU before introducing the hot gas 11 into the drying unit DU. In another embodiment where the temperature T1 is not overly high and is suitable for drying the rubber, the hot gas 11 can be directly introduced into the drying unit DU. Referring to FIG. 2, in this embodiment, as the gas produced by the drying unit DU contains volatile organic compounds or any other impurities unfit for discharge, the gas can be returned to the regenerative thermal oxidization unit RTU (the pipeline segment or fourth hot gas pipeline D2-W1) for further recovery and processing.

Referring to FIG. 2, the pipeline segment A2-H4 of the hot liquid pipeline H3-A1-A2-H4 is of the temperature T3. Upon receipt of heat from the heat recovery unit HRU, the pipeline segment H3-A1 is heated up to attain the temperature T4. The pipeline segment H3-A1 further connects the absorption refrigeration unit AHP to transfer heat to the absorption refrigeration unit AHP, such that the temperature decreases to T3 at the pipeline segment A2-H4. With the absorption refrigeration unit AHP operating, the temperature of the refrigerating liquid pipeline decreases from T6 (i.e., the temperature at the pipeline segment A7-A8) to T7 (i.e., the temperature at the pipeline segment A9-A10), whereas the temperature of the cooling liquid pipeline increases from T8 (i.e., the temperature at the pipeline segment A3-A4) to T9 (i.e., the temperature at the pipeline segment A5-A6). As shown in the diagram, the refrigerating liquid pipeline (pipeline segment A9-A10) enters the first heat exchanger 24 and absorbs heat from the styrene recovery pipeline (such as the pipeline segment c-d) that also enters the first heat exchanger 24. After exiting the first heat exchanger 24, the refrigerating liquid pipeline has its temperature changed from T7 (such as the temperature at the pipeline segment A9-A10) to T6 (such as the temperature at the pipeline segment A11-A12 and A13-A14). In this embodiment, a refrigerating water storage tank 28 and/or a booster pump 29 are/is disposed at the refrigerating liquid pipeline A11-A12-A13-A14-A7-A8 as needed. The refrigerating water storage tank 28 is in connection with another pipeline in order to regulate the temperature of the refrigerating liquid pipeline. The booster pump 29 enables the liquid to transfer easily along the pipelines.

Referring to FIG. 2, the chemical plant 200 comprises the heating unit B and the hot gas pipeline R1-C2-B2 connected to the heating unit B. Hence, the hot gas 11 discharged from the regenerative thermal oxidization unit RTU not only enters the hot gas pipeline R1-C2-H1 to thereby reach the heat recovery unit HRU, but also selectively enters another hot gas pipeline R1-C2-B2 to thereby reach the heating unit B. The hot gas pipeline R1-C2-B2 works in all situations, including the situation where the heat recovery unit HRU is idle temporarily but the regenerative thermal oxidization unit RTU is operating. Similarly, the chemical plant 200 comprises another hot gas pipeline H2-C1-C3-B3 connected to the heating unit B. Hence, the hot gas 11 discharged from the heat recovery unit HRU selectively enters the hot gas pipeline H2-C1-C3-B3 to thereby reach the heating unit B. The hot gas pipeline H2-C1-C3-B3 works in all situations, including the situation where the drying unit DU is idle temporarily but the heat recovery unit HRU is operating. The hot gas pipeline connected to the heating unit B prevents heat from being directly discharged to the chimney S to thereby cause a waste of energy. The heating unit B is further selectively equipped with a hot gas pipeline (not shown) whereby the hot gas 11, which passes through the heating unit B to cool down, is discharged to the chimney S.

Figure 3:
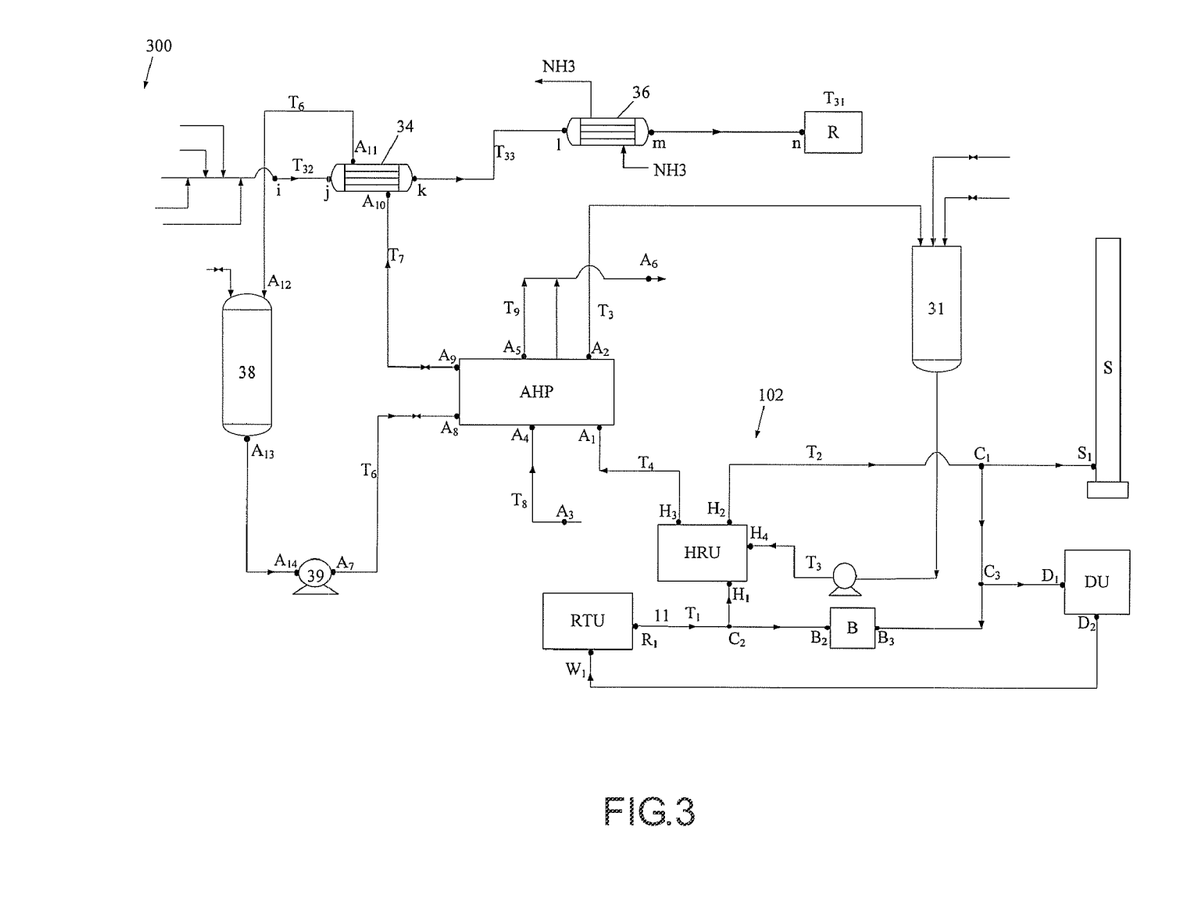
FIG. 3 is a schematic view of the application of another ecosystem to another plant according to a second embodiment of the present invention.

Referring to FIG. 3, there is shown a schematic view of the application of the ecosystem to another chemical plant 300 according to the second embodiment of the present invention. As shown in FIG. 3, the chemical plant 300 manufactures a rubber from raw materials, such as styrene, butadiene, water, and other chemicals. The chemical plant 300 comprises: a reactor R; a drying unit DU for drying the rubber; and a reacting solution pipeline i-j-k-l-m-n for transferring appropriate raw materials to the reactor R. As shown in the diagram, in this embodiment, the required raw materials, such as styrene, butadiene and water, are present in the pipeline segment i-j of the reacting solution pipeline. In this embodiment, the preset reaction temperature of the reactor R is lower than the temperature of the mixed reacting solution. Hence, to allow a reacting solution of an appropriate temperature to enter the reactor R, the chemical plant 300 uses an ecosystem 102 to reduce the temperature of the segment k-l-m-n of the reacting solution pipeline. As shown in the diagram, a first heat exchanger 34 is disposed at the reacting solution pipeline i-j-k-l-m-n and thereby connected to the ecosystem 102. With the ecosystem 102 operating, the reacting solution pipeline is initially of a temperature T32 (such as the temperature of the pipeline segment i-j); however, due to the chilling effect of the first heat exchanger 34, the pipeline segment k-l-m-n is of a temperature T33 or a lower temperature, where T33<T32. In addition to the first heat exchanger 34, the reacting solution pipeline i-j-k-l-m-n is connected to a second heat exchanger 36 as needed. The second heat exchanger 36 is a typical ammonia refrigerator or brine refrigerator and is not connected to the ecosystem 102. The second heat exchanger 36 assists the first heat exchanger 34 in making the temperature of the reacting solution in the reacting solution pipeline more suitable for the reactor R.

Referring to FIG. 3, there is shown a schematic view of the application of the ecosystem 102 to the chemical plant 300 having the drying unit DU according to the second embodiment of the present invention. Like the ecosystems 100, 101, the ecosystem 102 comprises the regenerative thermal oxidization unit RTU, the heat recovery unit HRU, the hot gas pipeline R1-H1-H2-D1, the absorption refrigeration unit AHP, the hot liquid pipeline H3-A1-A2-H4, the cooling liquid pipeline A3-A4-A5-A6, and the refrigerating liquid pipeline A7-A8-A9-A10-A11-A12-A13-A14. The regenerative thermal oxidization unit RTU turns a waste gas produced in the course of the manufacturing of the rubber by the chemical plant 300 into a clean gas (i.e., the hot gas 11). The heat recovery unit HRU is disposed at the hot gas pipeline R1-H1-H2-D1 and connected to the regenerative thermal oxidization unit RTU and the drying unit DU via the hot gas pipeline. The hot liquid pipeline H3-A1-A2-H4 connects the heat recovery unit HRU and the absorption refrigeration unit AHP. The hot liquid pipeline H3-A1-A2-H4 forms a loop and enables connection between the heat recovery unit HRU and the absorption refrigeration unit AHP. In this embodiment, a hot water storage tank 31 is disposed at the pipeline segment A2-H4 of the hot liquid pipeline as needed. The hot water storage tank 31 is in connecting with another pipeline, such as a steam condensing water pipeline or a process water pipeline in the plant, in order to regulate the temperature of the hot liquid pipeline H3-A1-A2-H4.

Referring to FIG. 3, the hot gas 11 produced when the waste gas is combusted and processed in the regenerative thermal oxidization unit RTU enters the hot gas pipeline R1-H1-H2-D1, passes through the heat recovery unit HRU, and eventually reaches the drying unit DU. The heat recovery unit HRU takes in a portion of heat from the hot gas 11 passing through the heat recovery unit HRU and transfers the portion of heat to the hot liquid pipeline. Hence, the temperature of the hot gas pipeline decreases from T1 (i.e., the temperature at the pipeline segment R1-H1) to T2 (i.e., the temperature at the pipeline segments H2-D1, H2-S1). Selectively, the hot gas 11 thus cooled is discharged to the chimney S via the pipeline segment H2-S1 or introduced into the drying unit DU via the pipeline segment H2-D1. In this embodiment, the drying unit DU serves to a dry rubber aggregate rich in moisture and comes in the form of a caterpillar-driven drying bed apparatus shown in FIG. 4 or any other fluidized bed dryer. In this embodiment, if the hot gas 11 is directly introduced into the drying unit DU, the rubber would probably be melted, decomposed or denatured due to the overly high temperature T1 of the hot gas 11. Hence, in view of the overly high temperature T1, it is necessary to reduce the temperature of the hot gas 11 appropriately with the heat recovery unit HRU before introducing the hot gas 11 into the drying unit DU. In another embodiment where the temperature T1 is not overly high and is suitable for drying the rubber, the hot gas 11 can be directly introduced into the drying unit DU. In this embodiment, as the gas produced by the drying unit DU contains volatile organic compounds or any other impurities unfit for discharge, the gas can be returned to the regenerative thermal oxidization unit RTU (the pipeline segment D2-W1) for further recovery and processing.

Referring to FIG. 3, the pipeline segment A2-H4 of the hot liquid pipeline H3-A1-A2-H4 has the temperature T3. After receiving heat from the heat recovery unit HRU, the pipeline segment H3-A1 is heated up to the temperature T4. The pipeline segment H3-A1 further connects the absorption refrigeration unit AHP and transfers heat to the absorption refrigeration unit AHP, such that temperature decreases to T3 at the pipeline segment A2-H4. With the absorption refrigeration unit AHP operating, the temperature of the refrigerating liquid pipeline decreases from T6 (i.e., the temperature at the pipeline segment A7-A8) to T7 (i.e., the temperature at the pipeline segment A9-A10), whereas the temperature of the cooling liquid pipeline increases from T8 (i.e., the temperature at the pipeline segment A3-A4) to T9 (i.e., the temperature at the pipeline segment A5-A6). As shown in the diagram, the refrigerating liquid pipeline enters the first heat exchanger 34 to absorb heat from the reacting solution pipeline (such as the pipeline segment i-j) that also enters the first heat exchanger 34. After exiting the first heat exchanger 34, the refrigerating liquid pipeline has its temperature changed from T7 (such as the temperature of the pipeline segment A9-A10) to T6 (such as the temperature of the pipeline segments A11-A12, A13-A14). In this embodiment, a refrigerating water storage tank 38 or a booster pump 39 is disposed at the refrigerating liquid pipeline A11-A12-A13-A14-A7-A8 as needed.

Referring to FIG. 3, the chemical plant 300 comprises the heating unit B and the hot gas pipeline R1-C2-B2 connected to the heating unit B. Hence, the hot gas 11 discharged from the regenerative thermal oxidization unit RTU not only enters the hot gas pipeline R1-C2-H1 to thereby reach the heat recovery unit HRU, but also selectively enters another hot gas pipeline R1-C2-B2 to thereby reach the heating unit B. The hot gas pipeline R1-C2-B2 works in all situations, including the situation where the heat recovery unit HRU is idle temporarily but the regenerative thermal oxidization unit RTU is operating. Similarly, the chemical plant 300 comprises another hot gas pipeline H2-C1-C3-B3 connected to the heating unit B. Hence, the hot gas 11 discharged from the heat recovery unit HRU selectively enters the hot gas pipeline H2-C1-C3-B3 to thereby reach the heating unit B. The hot gas pipeline H2-C1-C3-B3 works in all situations, including the situation where the drying unit DU is idle temporarily but the heat recovery unit HRU is operating. The pipeline segment connected to the heating unit B prevents heat from being directly discharged to the chimney S to thereby cause a waste of energy. The heating unit B is further selectively equipped with a hot gas pipeline (not shown) whereby the hot gas 11, which passes through the heating unit B to cool down, is discharged to the chimney S.

The present invention is disclosed above by preferred embodiments. However, persons skilled in the art should understand that the preferred embodiments are illustrative of the present invention only, but should not be interpreted as restrictive of the scope of the present invention. Hence, all equivalent changes or modifications made to the aforesaid embodiments without departing from the spirit embodied in the present invention should fall within the appended claims.

What is claimed is:

1. An ecosystem operated in a plant, the plant having a drying unit, the ecosystem comprising:
    a regenerative thermal oxidization unit for processing a waste gas to produce a hot gas;
    a first hot gas pipeline (R1-H1-H2-D1) connected to the regenerative thermal oxidization unit and the drying unit, wherein the hot gas from the regenerative thermal oxidization unit enters the drying unit via the first hot gas pipeline (R1-H1-H2-D1);
    a heat recovery unit disposed at the first hot gas pipeline (R1-H1-H2-D1) to absorb heat from the first hot gas pipeline (R1-H1-H2-D1);
    an absorption refrigeration unit connected to a target structural unit to be cooled in the plant; and
    a hot liquid pipeline connected to the heat recovery unit and the absorption refrigeration unit, wherein the heat recovery unit transfers the heat from the first hot gas pipeline (R1-H1-H2-D1) to the absorption refrigeration unit via the hot liquid pipeline so as to actuate the absorption refrigeration unit to cool the target structural unit; and
    wherein the plant further comprises a heating unit, and the ecosystem further comprises a second hot gas pipeline (R1-C2-B2) for connecting the heating unit and the regenerative thermal oxidization unit and a third hot gas pipeline (H2-C1-C3-B3) for connecting the heating unit and the heat recovery unit, and wherein the drying unit is configured to dry a chemical by blowing the hot gas from the regenerative thermal oxidization unit onto the chemical within the drying unit.

2. An ecosystem operated in a plant, the plant having a drying unit, the ecosystem comprising:
    a regenerative thermal oxidization unit for processing a waste gas to produce a hot gas;
    a first hot gas pipeline (R1-H1-H2-D1) connected to the regenerative thermal oxidization unit and the drying unit, wherein the hot gas from the regenerative thermal oxidization unit enters the drying unit via the first hot gas pipeline (R1-H1-H2-D1);
    a heat recovery unit disposed at the first hot gas pipeline (R1-H1-H2-D1) to absorb heat from the first hot gas pipeline (R1-H1-H2-D1);
    an absorption refrigeration unit connected to a target structural unit to be cooled in the plant; and
    a hot liquid pipeline connected to the heat recovery unit and the absorption refrigeration unit, wherein the heat recovery unit transfers the heat from the first hot gas pipeline (R1-H1-H2-D1) to the absorption refrigeration unit via the hot liquid pipeline so as to actuate the absorption refrigeration unit to cool the target structural unit; and
    wherein the plant further comprises a heating unit, and the ecosystem further comprises a second hot gas pipeline (R1-C2-B2) for connecting the heating unit and the regenerative thermal oxidization unit and a third hot gas pipeline (H2-C1-C3-B3) for connecting the heating unit and the heat recovery unit.

3. The ecosystem of claim 2, further comprising a fourth hot gas pipeline (D2-W1) connected to the drying unit and the regenerative thermal oxidization unit and adapted to transfer the hot gas from the drying unit to the regenerative thermal oxidization unit.

4. The ecosystem of claim 2, wherein the hot liquid pipeline forms a loop to enable connection between the absorption refrigeration unit and the heat recovery unit.

5. The ecosystem of claim 2, further comprising a refrigerating liquid pipeline connecting the absorption refrigeration unit and the target structural unit, the refrigerating liquid pipeline forming a loop to enable connection between the absorption refrigeration unit and the target structural unit.

* * * * *